R. J. TURNER.
NUT OR BOLT LOCK.
APPLICATION FILED NOV. 27, 1914.

1,195,877.

Patented Aug. 22, 1916.
2 SHEETS—SHEET 1.

Witnesses

Inventor
R. J. Turner.
By
Attorney

R. J. TURNER.
NUT OR BOLT LOCK.
APPLICATION FILED NOV. 27, 1914.
1,195,877.
Patented Aug. 22, 1916.
2 SHEETS—SHEET 2.
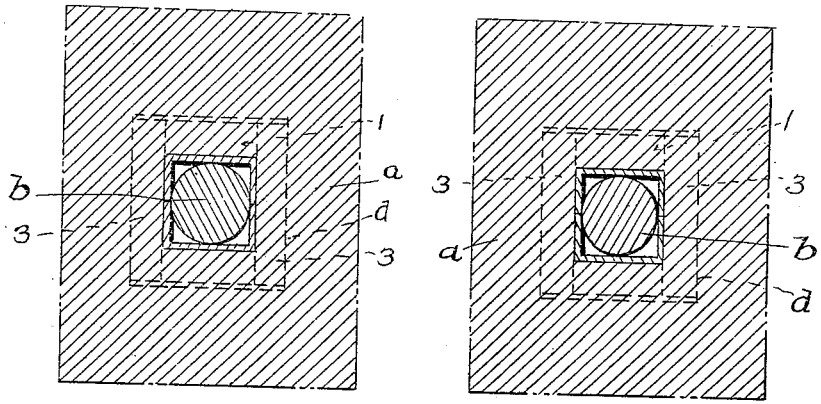
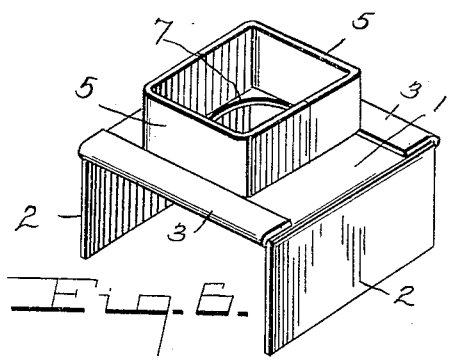
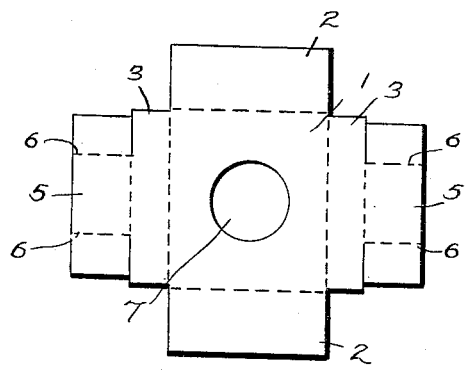
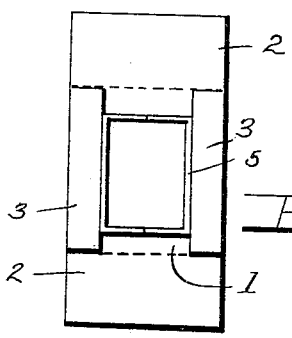
Witnesses
Inventor
R. J. Turner.
By
Attorney

UNITED STATES PATENT OFFICE.

RUFUS J. TURNER, OF FORT McPHERSON, GEORGIA.

NUT OR BOLT LOCK.

1,195,877.   Specification of Letters Patent.   Patented Aug. 22, 1916.

Application filed November 27, 1914. Serial No. 874,253.

*To all whom it may concern:*

Be it known that I, RUFUS J. TURNER, a citizen of the United States, residing at Fort McPherson, in the county of Fulton and State of Georgia, have invented certain new and useful Improvements in Nut or Bolt Locks; and I do hereby declare the following to be a full, clear, and exact description of the invention, such as will enable others skilled in the art to which it appertains to make and use the same.

This invention relates to nut or bolt locks, and one of the principal objects of the invention is to provide devices of simple construction for preventing the bolt from turning in its bore or socket, and also for preventing the nut from turning off the bolt and means being also provided whereby lag screws are prevented from rotating and becoming loose in their screw threaded sockets.

The foregoing and other objects may be attained by means of the construction illustrated in the accompanying drawing, in which—

Figure 1:
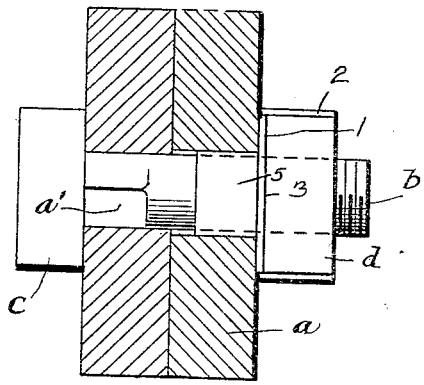
Figure 2:
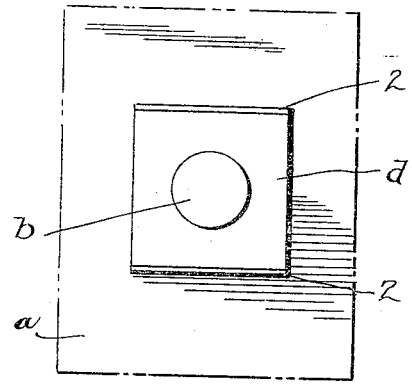
Figure 3:
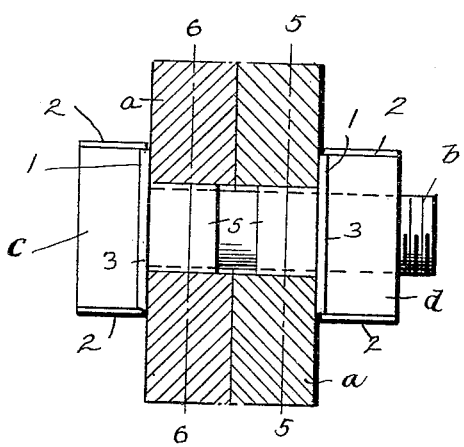

Figure 1 is a sectional view through two pieces of material secured together by a bolt or nut, said nut being held on the bolt by a nut lock made in accordance with this invention, Fig. 2 is a view in elevation looking at the nut end of the bolt, Fig. 3 is a view similar to Fig. 1 showing a nut lock and a bolt lock made in accordance with this invention, Fig. 4 is a sectional view taken on the line 5—5 of Fig. 3, Fig. 5 is a sectional view taken on the line 6—6 of Fig. 3, Fig. 6 is an inverted perspective view of the nut and bolt lock, Fig. 7 is a plan view of the blank from which the device is formed, and Fig. 8 is a slightly modified form in which the rectangular box for the bolt bore or socket is elongated.

Referring to the drawings by reference numerals, and particularly to Fig. 6 wherein is shown an inverted perspective view of the device, 1 designates a rectangular body which has projecting from opposite edges thereof, a pair of locking elements or flanges 2. These elements or flanges 2 project beyond the outer face of the body 1 and are adapted to engage the opposite sides of a nut to prevent it from turning upon a bolt. Extending from the other edges of the body 1, and lying in engagement with the inner side thereof, are flanges 3 which carry a box or bushing 5. The box or bushing 5 extends from the inner face of the body 1, and it is adapted to engage the walls of the opening through which the bolt passes to prevent the device from turning. The flanges 3 not only connect the box or bushing 5 to the body 1, but also strengthen or reinforce the body. The body 1 is provided with a central bolt receiving aperture 7 which is located between the locking elements or flanges 2 and between the walls of the box or bushing 5. This aperture may be of any shape, depending upon the cross sectional formation of the bolt in connection with which the device is used.

In Figs. 1 and 2 of the drawings, the device is shown used as a nut lock. In these figures, *b* designates the shank, and *c* the head of a bolt. The shank *b* is shown as passing through a pair of members *a*, and the shank is provided with an angular portion *a'* which is adapted to prevent the bolt from turning with relation to the members *a*. Before the nut *d* is applied to the shank *b* of the bolt, the locking device is applied, the shank passing through the opening 7 and the box or bushing 5 fitted in the opening in the member *a* through which the shank *b* passes. The box or bushing 5 prevents the locking device from turning with relation to the shank *b*. The nut *d* is then applied, after which the locking elements or flanges are bent into engagement with opposite sides of the nut *d* holding the nut against accidental turning. The manner in which the box or bushing 5 is adapted to engage the walls of the opening in the member *a* through which the shank *b* of the bolt passes, is clearly shown in Fig. 4 of the drawings.

In Figs. 3 and 5, the device is shown used as a nut lock and as means for preventing the bolt from turning with relation to the members *a*. In this instance, the shank *b* of the bolt is cylindrical throughout its entire length, and one of the devices is used to prevent the bolt from turning with relation to the members *a*, and the manner in which it is used for this purpose is clearly illustrated in Figs. 3 and 5. In Fig. 8 there is shown a modification of the device, the modification residing in making the box or bushing elongated.

The blank from which the device is made is shown in Fig. 7 of the drawings, and as it should be apparent how the blank may be bent to provide the device, a detailed description of the blank is deemed unnecessary.

What is claimed is:—

1. A bolt and nut lock comprising a body portion, said body portion having a pair of nut locking elements adapted to be bent to project beyond the outer face of said body portion, said body portion having a bolt receiving aperture, a pair of flanges on the inner face of said body portion, and an angular box or bushing carried by said flanges.

2. A bolt and nut lock comprising a rectangular body portion, a pair of nut locking elements projecting beyond the outer face of said body portion from opposite edges thereof, a pair of flanges projecting from the other edges of said body portion and lying in engagement with the inner face of said body portion, and an angular box or bushing carried by said flanges, said flanges strengthening and reinforcing the body portion.

In testimony whereof I affix my signature in presence of two witnesses.

RUFUS J. TURNER.

Witnesses:
A. L. PHILLIPS,
A. J. MAYFIELD.

Copies of this patent may be obtained for five cents each, by addressing the "Commissioner of Patents. Washington, D. C."